(12) United States Patent
Montero et al.

(10) Patent No.: US 10,228,731 B2
(45) Date of Patent: Mar. 12, 2019

(54) CONTROLLER FOR RETRACTABLE KEYBOARDS

(71) Applicant: Dell Products L.P., Round Rock, TX (US)

(72) Inventors: Adolfo S. Montero, Pflugerville, TX (US); Merle J. Wood, III, Round Rock, TX (US)

(73) Assignee: Dell Products L.P., Round Rock, TN (US)

( * ) Notice: Subject to any disclaimer, the term of this patent is extended or adjusted under 35 U.S.C. 154(b) by 153 days.

(21) Appl. No.: 15/474,661

(22) Filed: Mar. 30, 2017

(65) Prior Publication Data

US 2018/0284846 A1 Oct. 4, 2018

(51) Int. Cl.
| | |
|---|---|
| *G06F 1/00* | (2006.01) |
| *G06F 1/16* | (2006.01) |
| *H01H 47/00* | (2006.01) |
| *G06F 3/02* | (2006.01) |

(52) U.S. Cl.
CPC .......... *G06F 1/1666* (2013.01); *G06F 1/1616* (2013.01); *G06F 3/02* (2013.01); *H01H 47/002* (2013.01)

(58) Field of Classification Search
CPC ................................. G06F 1/1666; G06F 3/02
USPC ................................................ 400/492, 495
See application file for complete search history.

(56) References Cited

U.S. PATENT DOCUMENTS

| | | | | |
|---|---|---|---|---|
| 5,971,637 A | * | 10/1999 | Malhi | G06F 1/1616 361/679.13 |
| 6,019,530 A | * | 2/2000 | Lanzetta | G06F 1/1616 400/490 |
| 6,559,399 B2 | * | 5/2003 | Hsu | H01H 3/125 200/344 |
| 8,226,310 B2 | * | 7/2012 | Grant | H01H 9/0242 361/679.13 |
| 9,501,105 B2 | * | 11/2016 | Kershek | G06F 1/1666 |
| 9,785,195 B2 | * | 10/2017 | Amarilio | G06F 1/1618 |
| 2011/0170250 A1 | * | 7/2011 | Bhutani | G06F 1/1666 361/679.2 |
| 2011/0304550 A1 | * | 12/2011 | Romera Jolliff | G06F 3/016 345/168 |
| 2013/0235512 A1 | * | 9/2013 | Chiang | G06F 1/1666 361/679.01 |

(Continued)

*Primary Examiner* — Adi Amrany
(74) *Attorney, Agent, or Firm* — Norton Rose Fulbright US LLP

(57) ABSTRACT

A controller and methods for controlling a retractable keyboard are disclosed. The controller may control and monitor an extend operation of the retractable keyboard using a first pin, and control and monitor a retract operation of the retractable keyboard using a second pin. Open drain signaling may be used on the pins to allow control and monitoring through the same pin. To control and monitor the extend (or retract) operation using a single pin, the controller releases the voltage at the pin to a floating high state to activate the muscle wire to extend (or retract) the keyboard. During the operation, the controller checks the voltage state at the pin. If the voltage at the pin has been pulled to low by the closing of a limit switch, the controller determines that the extend (or retract) operation has completed and in response drives the pin to a low voltage state to deactivate the muscle wire.

20 Claims, 7 Drawing Sheets

(56) References Cited

U.S. PATENT DOCUMENTS

2015/0205368 A1* 7/2015 Yairi .................. G06F 3/046
  345/173
2016/0334835 A1* 11/2016 Tamura ............... G06F 1/1616
2018/0253124 A1* 9/2018 David ................. G06F 1/1666

* cited by examiner

CONTROLLER FOR RETRACTABLE KEYBOARDS

FIELD OF THE DISCLOSURE

The instant disclosure relates to computer systems. More specifically, portions of this disclosure relate to controller for retractable keyboards for computer systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems, especially laptop computers, usually have a physical keyboard integrated into a housing of the computer. The size, and particularly the thickness, of laptop computers shrink due, in part, to innovations in miniaturizing the electrical components in the laptop. However, certain physical features of a laptop are difficult to shrink because of physical requirements. A keyboard in a laptop computer is one of those physical features that are difficult to shrink. A user's touch perception for operating the keyboard is generally proportional to an amount of travel in the keys. For example, some laptop keyboards may have 2 mm of travel, a virtual keyboard on a touchscreen has 0 mm of travel, and a physical desktop keyboard may have 4 mm of travel. The amount of travel in the keyboard of a laptop computer allows for a thinner laptop at the expense of tactile feedback to the user. However, with less tactile feedback a user is more prone to typing errors and decreasing user satisfaction.

SUMMARY

A laptop computer with a retractable keyboard may allow a disruption in conventional laptop design in which the laptop thickness is restricted by the travel distance of the keyboard. A keyboard can allow thinner laptop design by retracting the keys to allow the laptop computer to fold into a smaller volume when the lid is closed. The keyboard can allow longer travel distances in the keys by extending the keys when the lid is open. Extending and retracting the keys allows for the travel distance to be maintained and space in the keys that provides the travel to have a smaller impact on laptop design and thickness.

The retraction and extension of the keyboard may be effected by muscle wires. The retractable keyboard may be extended by muscle wires to protrude from the laptop chassis when the computer is in use so that a user may comfortably type on the keyboard. The retractable keyboard may be retracted by muscle wires into the chassis of the laptop computer to safely store the keyboard. Opening or closing the lid of the laptop computer may trigger the retract or extend operations of a retractable keyboards. A limit switch may determine the completion of the retract or extend operation. Thus, controlling of the extending or retracting of the retractable keyboard may include two parts: controlling the muscle wires and monitoring the state of the limit switch. Each muscle wire is controlled by a separate pin of a controller. One solution for controlling either the extend or retract operation is to dedicate one pin to control each of the two muscle wires and another pin to monitor the state of the limit switch coupled to the circuit for each of the muscle wires. This solution thus uses four pins to control and monitor two muscle wires. The cost of the controller is based, in part, on the number of pins on the controller. Thus, reducing this number of pins can reduce the cost and complexity of an embedded controller for the laptop computer.

A single pin may be used to both monitor and control one or more muscle wires. The controller may control and monitor an extend operation of the retractable keyboard using a first pin and may control and monitor a retract operation of the retractable keyboard using a second pin. One signaling technique that may be used on a single pin for control and monitoring is an open drain output, in which a transistor is coupled to the pin and is configured to alternate between pulling the pin to low and disconnecting from the pin. Another signaling technique that may be used on a single pin for control and monitoring is similar in configuration to the open collector output, but couples a MOSFET to the pin. Operation of a controller and muscle wire according to an open drain signaling technique is described in example embodiments, however the examples may alternatively be operated according to an open collector signaling technique.

In open drain signaling, the pin of the controller may be driven low by one or several sources or otherwise left floating high. To control and monitor the extend (or retract) operation using a single pin, the controller allows the pin to float high to activate the muscle wire to extend (or retract) the keyboard. During the operation, the controller can sample the pin and determine whether the voltage state at the pin is floating high or low. If the voltage at the pin is pulled low, such as by the closing of a limit switch connected to the ground, the controller determines that the extend (or retract) operation has completed. Due to the open-drain configuration, the pin is pulled to a low voltage state by the closing of the limit switch, which deactivates the muscle wire. After the extend (or retract) operation, the controller drives the pin to a low voltage state.

According to one embodiment, the controller may include: a first pin configured to control and monitor an extend operation of a retractable keyboard, wherein the controller is configured to control and monitor the extend operation through a single pin; and a second pin configured to control and monitor a retract operation of the retractable keyboard, wherein the controller is configured to control and monitor the retract operation through a single pin. In some embodiments, a controller is configured to control and monitor through a single pin by determining whether the single pin floats high when not driven by the controller.

In certain embodiments, the controller is configured to perform steps comprising: driving the second pin to a floating high state to begin the retract operation; and determining the retract operation is complete by monitoring the second pin. The controller may determine that the retract operation is complete based on detecting that the second pin is pulled low by the closing of a limit switch. The controller may also be configured to drive the second pin to a low state after determining the retract operation is complete.

In certain embodiments, the controller is configured to perform steps comprising: driving the first pin to a floating high state to begin the extend operation; and determining the extend operation is complete by monitoring the first pin. The controller may determine that the extend operation is complete based on detecting that the second pin is pulled low by the closing of a limit switch. The controller may also be configured to drive the first pin to a low state after determining the extend operation is complete.

According to one embodiment, an apparatus includes: a keyboard; a first muscle wire coupled to the keyboard and configured to extend the keyboard to a first position to receive user input; a second muscle wire coupled to the keyboard and configured to retract the keyboard to a second position to store the keyboard in a computer chassis; a first muscle wire drive circuit coupled to the first muscle wire; a second muscle wire drive circuit coupled to the second muscle wire; and a general purpose input/output (GPIO) controller coupled to the first muscle wire drive circuit and to the second muscle wire drive circuit.

The first muscle wire controller may include a first output node controlled to apply a first voltage to the first muscle wire to begin an extend operation; a first input node for receiving a first control signal to enable or disable output of the first voltage to the first output node; and a first limit switch configured to couple the first input node to the ground when the first limit switch is closed.

The second muscle wire controller may include: a second output node controlled to apply a second voltage to the second muscle wire to begin an retract operation; a second input node for receiving a second control signal to enable or disable output of the second voltage to the second output node; and a second limit switch configured to couple the second input node to the ground when the second limit switch is closed.

The GPIO controller may include: a first pin configured to control and monitor an extend operation of the keyboard, wherein the controller is configured to control and monitor the extend operation through a single pin; and a second pin configured to control and monitor a retract operation of the keyboard, wherein the controller is configured to control and monitor the retract operation through a single pin. In some embodiments, the controller is configured to control and monitor through a single pin by determining whether the single pin floats high when not driven by the controller.

In some embodiments, the apparatus may further include a lid coupled to the keyboard, wherein the controller is configured to: control and monitor the retract operation of the keyboard when an angle between the retractable keyboard and the lid is within a predetermined range; and control and monitor the extend operation of the keyboard when an angle between the retractable keyboard and the lid is out of the predetermined range.

In some embodiments, the first limit switch is configured to close only when the keyboard is extended to the first position and the second switch is configured to close only when the keyboard is retracted to the second position.

Embodiments of a method for controlling a retractable keyboard are disclosed. According to one embodiment, the method may include: controlling and monitoring, through a first pin of a controller, an extend operation of a retractable keyboard; and controlling and monitoring, through a second pin of the controller, a retract operation of the retractable keyboard.

In some embodiments, the method may further include: driving the second pin to a floating high state to begin the retract operation; and determining the retract operation is complete by monitoring the second pin. The method may also include driving the second pin to a low state after determining the retract operation is complete.

In certain embodiments, the method may further include: driving the first pin to a floating high state to begin the extend operation; and determining the extend operation is complete by monitoring the first pin. The method may also include driving the first pin to a low state after determining the extend operation is complete.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Figure 1:
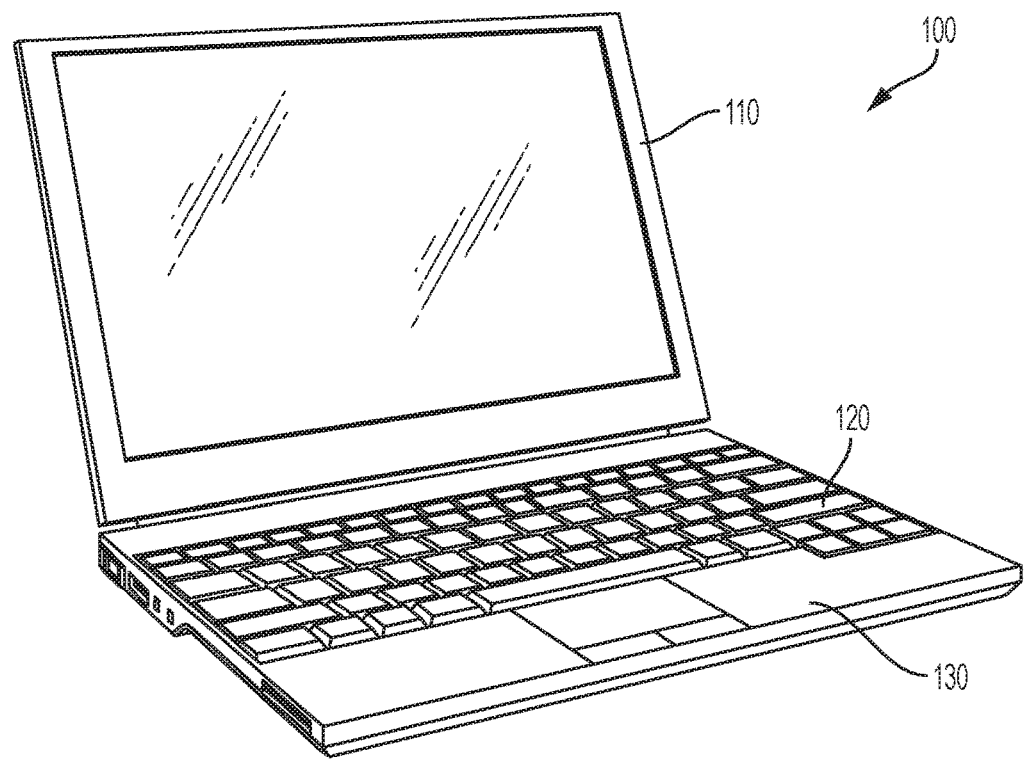
FIG. 1 illustrates an example of an information handling system with a retractable keyboard according to some embodiments of the present disclosure.

FIG. 1 illustrates an example information handling system 100 with a retractable keyboard according to one aspect of the present disclosure. Information handling system 100 includes a lid 110 with an integrated display and a keyboard 120 housed in a chassis 130. The chassis 130 may include a touchpad with one or more push buttons configured to receive user input. The keyboard 120 may be coupled to chassis 130 via one or more muscle wires (not shown) attached to the bottom of keyboard 120. The muscle wires may be configured to expand to raise keyboard 120 up in certain states (e.g., when lid 110 is opened up) such that a user may comfortably type on the keyboard and configured to retract to lower keyboard 120 back into chassis 130 in other states (e.g., when lid 110 is closed) such that the keyboard is safely stored. The muscle wire may be made of a material that shrinks or stretches in response to the application of an electrical signal to the muscle wire. For example, two sets of muscle wires may be attached to keyboard 120. When the first set of muscle wires shrinks (or stretches) it may apply a force to the keyboard 120 to raise the keyboard. After the keyboard 120 is raised, the muscle wire is deactivated and releases the force on the keyboard 120. When a second set of muscle wires shrinks (or stretches) it may apply an opposite force and lower the keyboard 120 to return to the chassis 130.

A controller (not shown), such as an embedded controller, may be used to begin the expand or retract operations. The controller may receive instructions from software executing on the system 100 to initiate a retract or expand operation. The controller may autonomously initiate a retract or expand operation based on input received from other sensors. For example, an accelerometer may be used to determine an orientation of the system 100. The controller may choose to retract or expand the keyboard 120 based on the orientation. As another example, a sensor in a hinge between the chassis 130 and the lid 110 may be used to determine an angle between the chassis 130 and the lid 110. The controller may choose to retract or expand the keyboard 120 based on the angle.

Figure 2A:
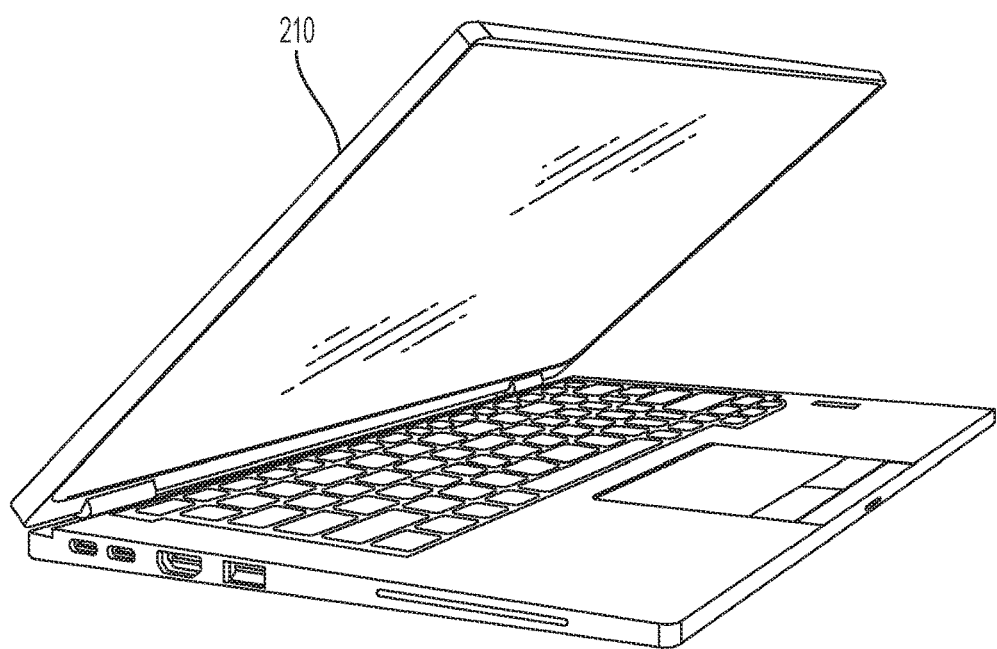
FIGS. 2A-C illustrates an example information handling system with a retractable keyboard operating in different states according to some embodiments of the present disclosure.
Figure 2B:
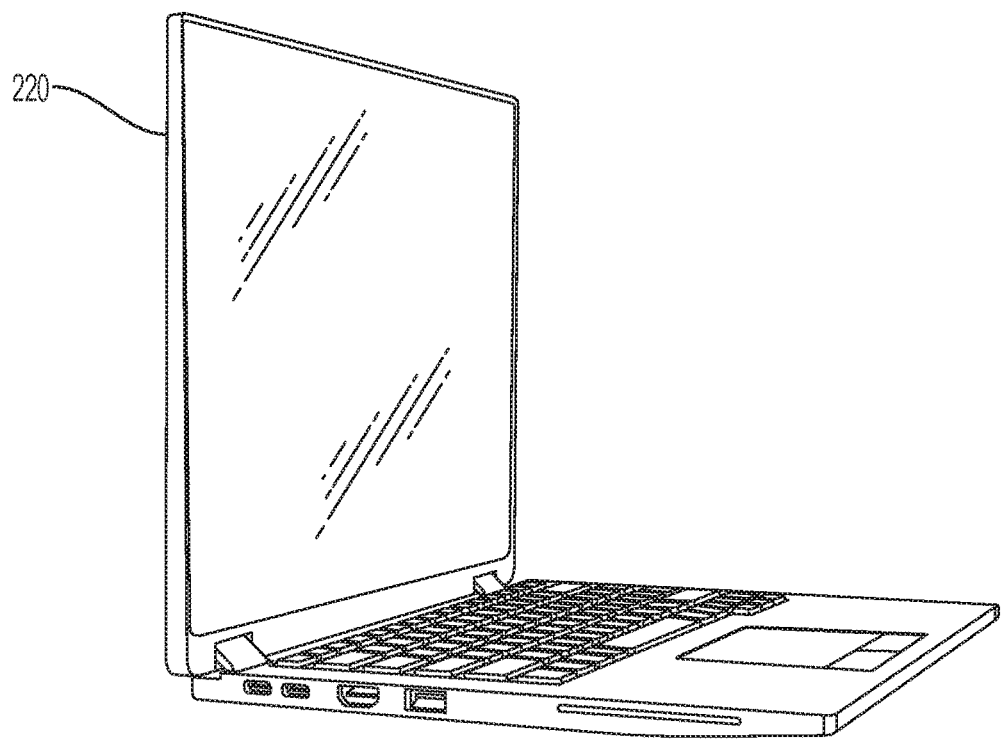
Figure 2C:
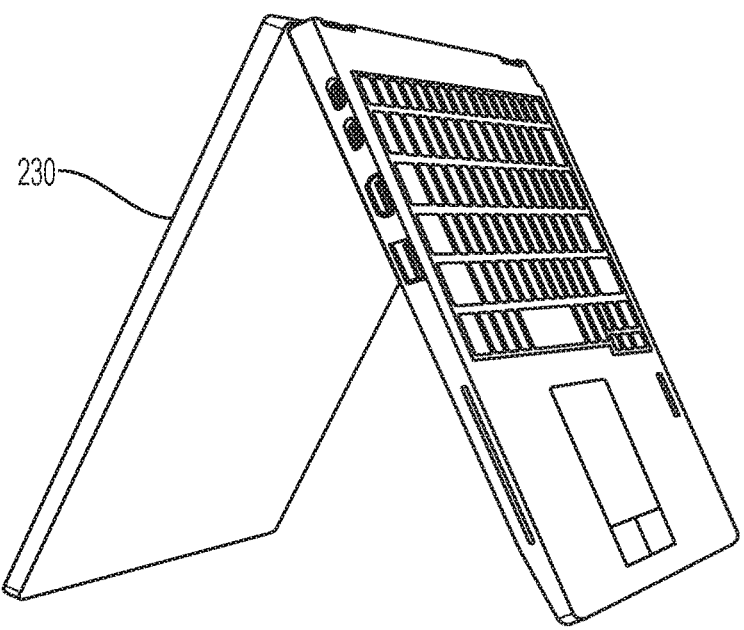

FIGS. 2A-C illustrates information handling system 100 in various states with the retractable keyboard retracted or extended according to some embodiments of the disclosure. In states 210 and 230 of FIGS. 2A and 2C, keyboard 120 is retracted inside the chassis 130. In the retracted state, the upper surface of the keyboard 120 may be at the same level with or lower than the upper surface of the chassis 130, or alternatively, only slightly higher than the upper surface of the chassis 130. In state 220 of FIG. 2B, the keyboard 120 is extended upward so that the upper surface of the keyboard 120 is at a higher level than the upper surface of the chassis 130. Information handling system 100 may be configured such that keyboard 120 is extended up when an angle between lid 110 and chassis 130 is within a predetermined range and keyboard 120 is retracted down when the angle is out of the predetermined range. For example, information handling system 100 may be configured such that keyboard 120 is extended up when the angle between lid 110 and chassis 130 is between 60 and 200 degrees and keyboard 120 is retracted down when the angle is between 0 to 60 degrees or between 200 to 360 degrees. One or more accelerometer sensors and/or Hall sensors may be included in information handling system 100 to detect the angle between lid 110 and chassis 130 and transmit the angle information to a controller to control the retraction and extension of keyboard 120. In some embodiments, information handling system 100 may allow a user to customize the system to define when keyboard 120 is retracted down or extended up.

Figure 3:
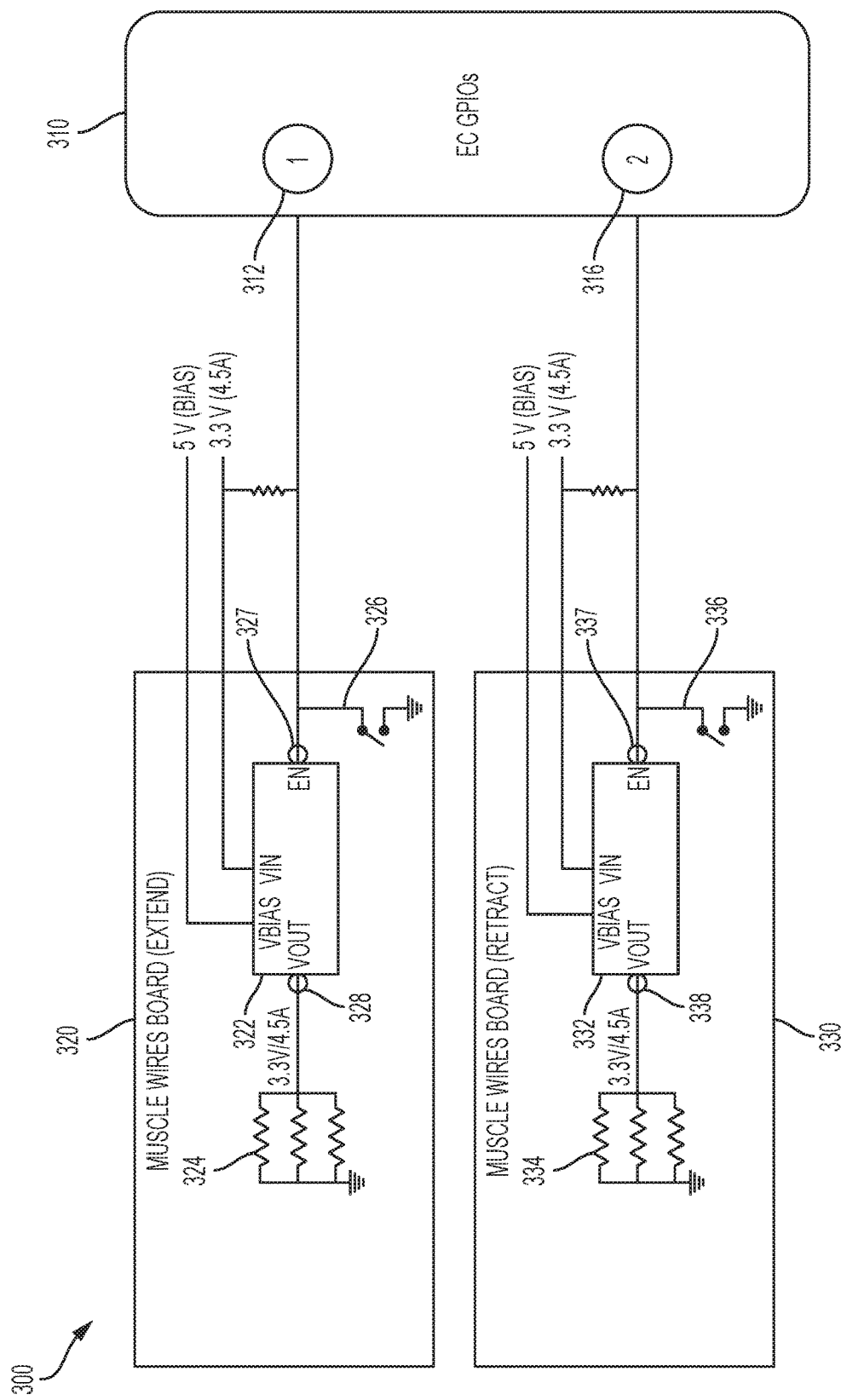
FIG. 3 illustrates an example block diagram of a configuration for controlling keyboard extend and retract operations in an information handling system according to some embodiments of the present disclosure.

Control of the extend operation and retract operation through single general purpose input/output pins (GPIOs) is described with reference to the example circuit of FIG. 3. FIG. 3 illustrates an example block diagram of a circuit 300 for controlling retractable keyboard 120 according to some embodiments of the present disclosure. Circuit 300 includes an embedded controller 310 coupled to a first muscle wire unit 320 and to a second muscle wire unit 330. First muscle wire unit 320 may be configured to extend keyboard 120 up by applying a control signal to muscle wires 324; second muscle wire unit 330 may be configured to retract keyboard 120 down into chassis 130 by applying a control signal to muscle wires 334.

First muscle wire unit 320 may include a first muscle wire controller 322 with a first input enable node 327 and a first output node 328, a first muscle wire set 324 (which may include one or more muscle wires) coupled to the first muscle wire controller 322 via its first output node 328, and a first limit switch 326 (which is coupled to the ground) coupled to first muscle wire controller 322 via its first input node 327. First muscle wire unit 320 may be connected to keyboard 120 via first muscle wire set 324 and to a first pin 312 of embedded controller 310 via first input node 327. Similarly, second muscle wire unit 330 may include a second muscle wire controller 332 with a second input enable node 337 and a second output node 338, a second muscle wire set 334 (which may include one or more muscle wires) coupled to the second muscle wire controller 332 via its second output node 338, and a second limit switch 336 (which is coupled to the ground) coupled to second muscle wire controller 332 via its second input node 337. Second muscle wire unit 330 may be connected to keyboard 120 via second muscle wire set 334 and coupled to a second pin 316 of embedded controller 310 via second input node 337. First pin 312 and second pin 316 may be general-purpose input/output (GPIO) pins.

Embedded controller 310 may be configured to control and monitor an extend operation of keyboard 120 through first pin 312 and configured to control and monitor a retract operation of keyboard 120 through second pin 316. In this configuration, embedded controller 310 may control and monitor the extension of keyboard 120 using a single pin, and the retraction of keyboard 120 using another single pin. To control and monitor an extend operation of keyboard 120, embedded controller 310 may release the first pin 312 to a floating high state to begin the extend operation, and determine whether the extend operation is complete by monitoring the voltage state on first pin 312. The limit switch 326 may drive the first pin 312 to a low state when the operation is complete. After determining that the extend operation is complete, embedded controller 310 may then drive the first pin 312 to a low voltage state. Similarly, to control and monitor a retract operation of keyboard 120, embedded controller 310 may release the second pin 316 to a floating high state to begin the retract operation, and determine whether the retract operation is complete by monitoring the voltage state on second pin 316. The limit switch 336 may drive the second pin 318 to a low state when the operation is complete. After determining that the retract operation is complete, embedded controller 310 may then drive the second pin 316 to a low voltage state.

In order to monitor the extend (or retract) operation of keyboard 120 using the same single pin as used for control of the muscle wires, embedded controller 310 may determine whether the single pin used for the operation is in a floating high state when not driven by the embedded controller 310. For example, embedded controller 310 releases the first pin 312 to a floating high state when performing the extend operation; thus, the input voltage at first input node 327 of first muscle wire controller 322 would be high to enable the controller 322 and generate an output voltage at first output node 328, which activates the first muscle wire set 324. While first muscle wire set 324 is shrinking (or stretching), embedded controller 310 may check the voltage state at first pin 312. If the check finds that the voltage state at first pin 312 is still high, embedded controller 310 determines that the extend operation has not completed, and thus continues to leave the first pin 312 floating high. When the extend operation is complete, first limit switch 326 closes, pulling the voltage state at first pin 312 to low, which disables the output voltage 328. After embedded controller 310 detects that the voltage state at first pin 312 is low, it determines that the extend operation is complete and in response drives the voltage at first pin 312 to low. During a retract operation, similar process is performed by the embedded controller 310 to control and monitor the voltage state at second pin 316. The above described process has the advantage of using only a single pin to control and monitor the extend (or retract) operation of keyboard 120, instead of using one pin to control the muscle wire and another pin to monitor the state of limit switch.

Figure 4:
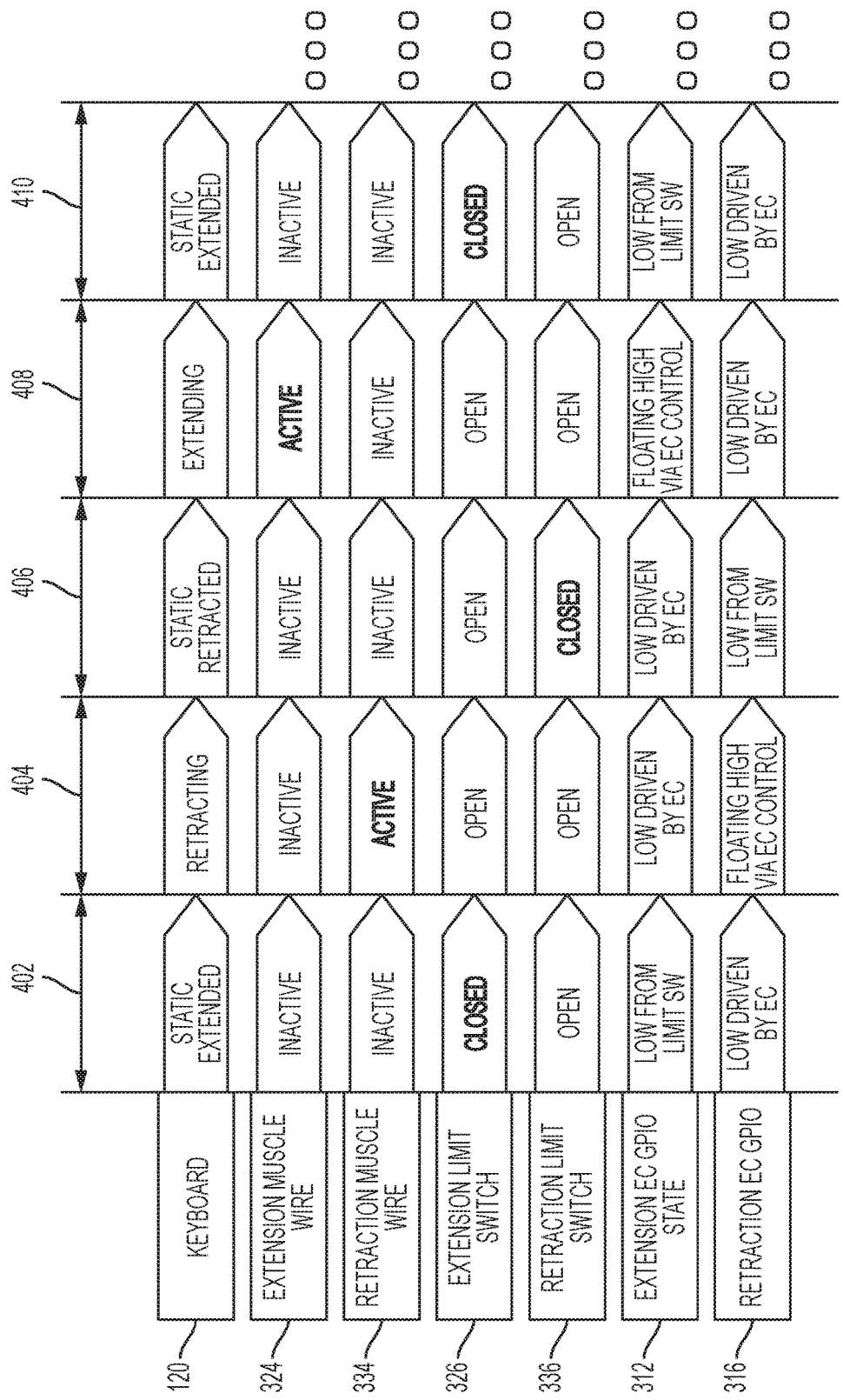
FIG. 4 illustrates an example timing diagram showing extend and retract operations for controlling a retractable keyboard of an information handling system according to some embodiments of the present disclosure.

The signals applied throughout the operation of muscle wires using open drain signaling is described with reference to FIG. 4. FIG. 4 illustrates a diagram showing operational states of various components at different operation stages for controlling retractable keyboard 120 according to some embodiments of the present disclosure. At stage 402, keyboard 120 is in a static extended state. In the extended state, the first limit switch 326 (extension limit switch) is closed and second limit switch 336 (retraction limit switch) is open. Both first muscle wire set 324 (extension muscle wire) and second muscle wire set 334 (retraction muscle wire) are inactive. First pin 312 (extension pin) is in a low voltage state because first limit switch 326 is closed and connects ground to disable the muscle wire controller 320. Second pin 316 (retraction pin) is in a low voltage state driven by embedded controller 310.

At stage 404, a retract operation may be initiated, such as by movements of the lid 110 and/or chassis 130. For example, when the user moves lid 110 and/or chassis 130 to a position such that the angle between lid 110 and chassis 130 is outside of a predetermined range, embedded controller 310 releases retraction pin 316 to a floating high state, which activates retraction muscle wire set 334 and keyboard 120 starts retracting. The extension limit switch 326 changes from closed to open. The embedded controller 310 drives extension pin 312 to a low voltage state. Extension muscle wire set 324 remains inactive and retraction limit switch 336 remains open. The embedded controller 310 stops driving the second pin 316 to a low state, and the second pin 316 floats high because neither the embedded controller 310 nor the limit switch 336 are pulling the second pin 316 low. With the second pin 316 in a floating high state, the muscle wire controller 330 is enabled and the retraction muscle wire 334 becomes active. The retraction muscle wire 334 remains active until either the embedded controller 310 or the limit switch 336 pull the second pin 316 low at stage 406. For example, the muscle wire continues to expand until a limit predefined limit is reached, which trigger the limit switch to close and the retraction stage 404 to complete and stage 406 begins.

At stage 406, the limit switch 336 closes, which pulls the voltage state at retraction pin 316 to low. Subsequently, the muscle wire controller 330 is disabled and the retraction muscle set 334 becomes inactive. The controller 310 may detect the low state of the retraction pin 316 to determine the retraction is complete, such that the controller 310 can control and monitor the retraction through the same pin. Extension limit switch 326 remains open, extension muscle wire set 324 remains inactive, and extension pin 312 is still low driven by embedded controller 310.

At stage 408, movements of the lid 110 and/or chassis 130 trigger an extend operation of keyboard 120. For example, an extend operation may begin when the user moves lid 110 and/or chassis 130 to a position such that the angle between lid 110 and chassis 130 is within a predetermined range. The embedded controller 310 releases extension pin 312 to a floating high state, which activates extension muscle wire set 324 and keyboard 120 starts extending. The retraction limit switch 336 changes from closed to open. The embedded controller 310 drives retraction pin 316, and remains low at stage 408 (now the low is driven by embedded controller 310). Retraction muscle wire set 334 remains inactive and extension limit switch 326 remains open.

At stage 410, the extension limit switch 326 closes when the muscle wire set 324 is completely extended such that the keyboard reaches its maximum height. The closing of extension limit switch pulls the voltage at extension pin 312 to low, which deactivates extension muscle set 324. Keyboard 120 reaches the static extended state. Now, every component returns to the states as in stage 402.

Figure 5:
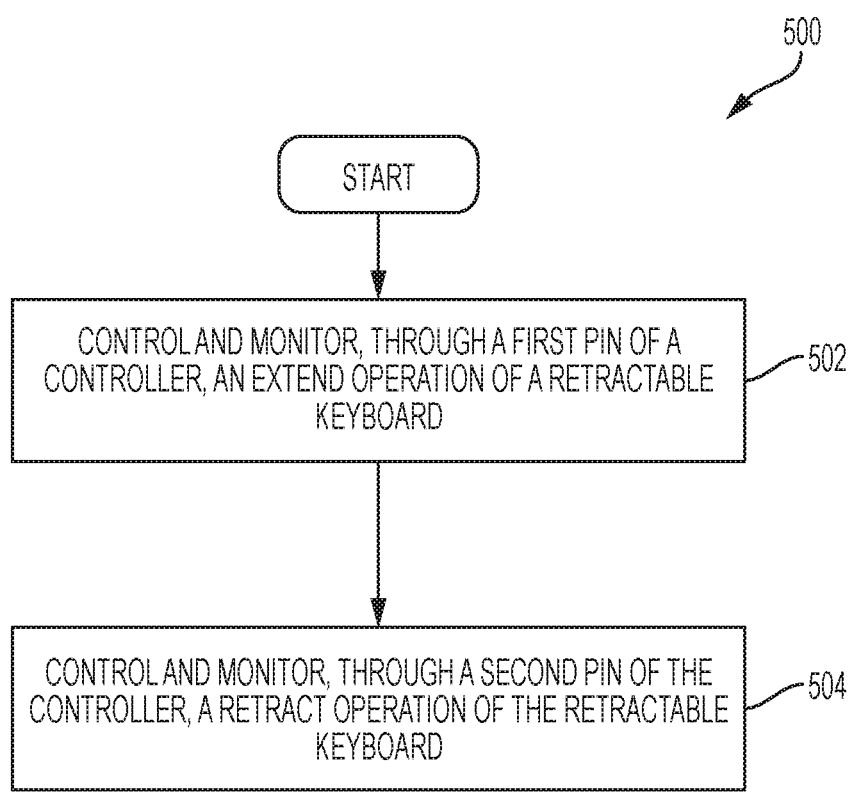
FIG. 5 illustrates a flow chart of an example method for controlling a retractable keyboard of an information handling system according to some embodiments of the present disclosure.

FIG. 5 illustrates an example of a method 500 for controlling a retractable keyboard of an information handling system according to one aspect of the present disclosure. Step 502 of method 500 includes the control and monitor of an extend operation of the retractable keyboard through a first pin of a controller. Step 504 includes the control and monitor of a retract operation of the retractable keyboard through a second pin of the controller. The controller may be embedded controller 310 as described above, and the first and second pins may be pins 312, 316 as described above.

Figure 6:
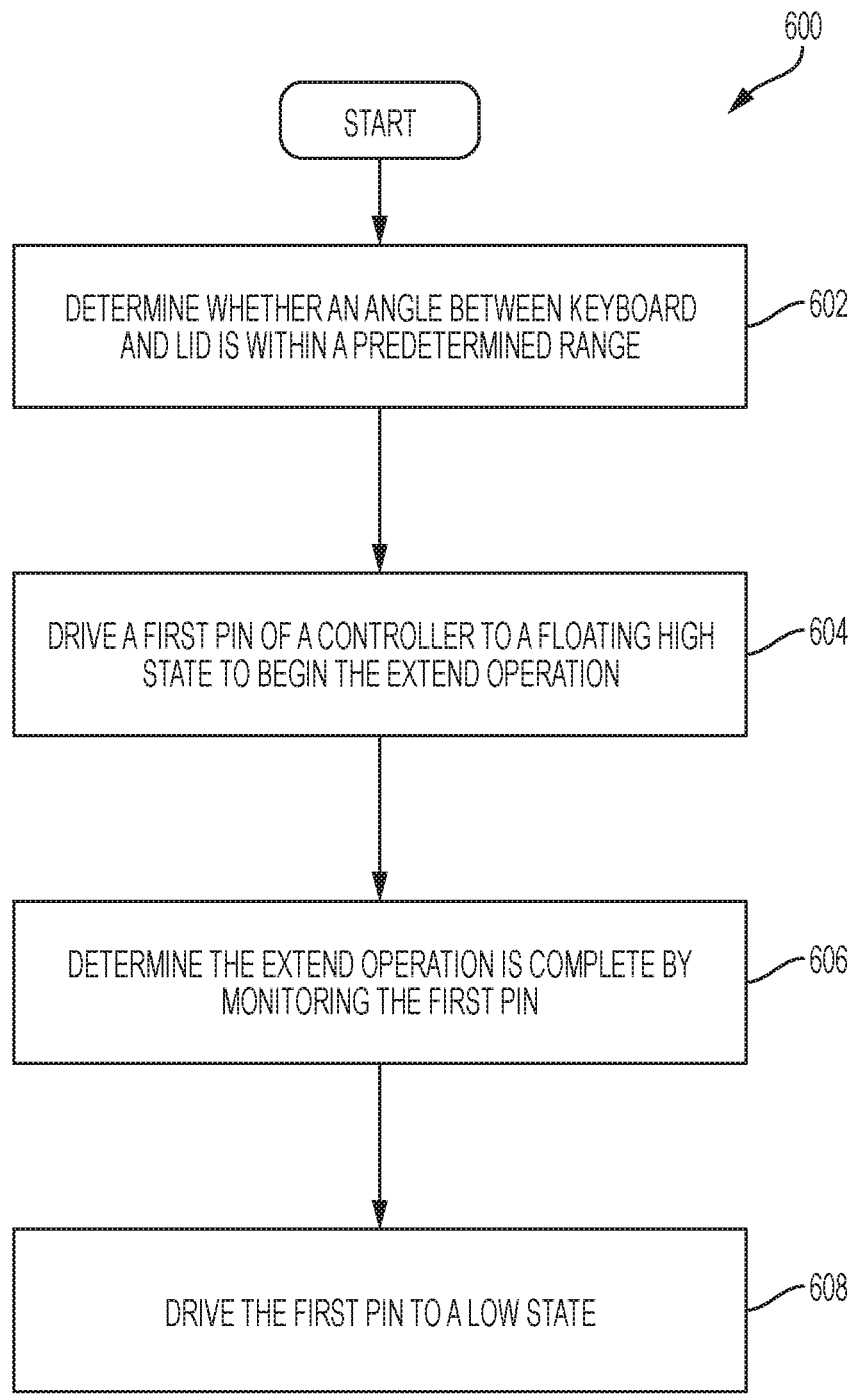
FIG. 6 illustrates a flow chart of an example method for controlling a retractable keyboard of an information handling system according to some embodiments of the present disclosure.

FIG. 6 illustrates an example of a method 600, such as performed by an embedded controller, for controlling an extend operation of a retractable keyboard of an information handling system according to one aspect of the present disclosure. Step 602 determines whether an angle of the keyboard and a lid of the information handling system is within a predetermined range. If so, at step 604, a controller of the system releases an extension pin to a floating high state to begin an extend operation of the retractable keyboard. Step 606 then determines whether the extend operation is complete by monitoring a voltage state at the extension pin. The controller determines the extend operation is complete by detecting the voltage of the extension pin is pulled low by a limit switch. After the extend operation is complete, step 608 drives the extension pin to a voltage low state. The angle between the keyboard and the lid may be monitored by one or more sensors of the information handling system. And the monitoring of whether the extend operation is complete may be performed by a process as described above in connection with FIGS. 3-4.

Figure 7:
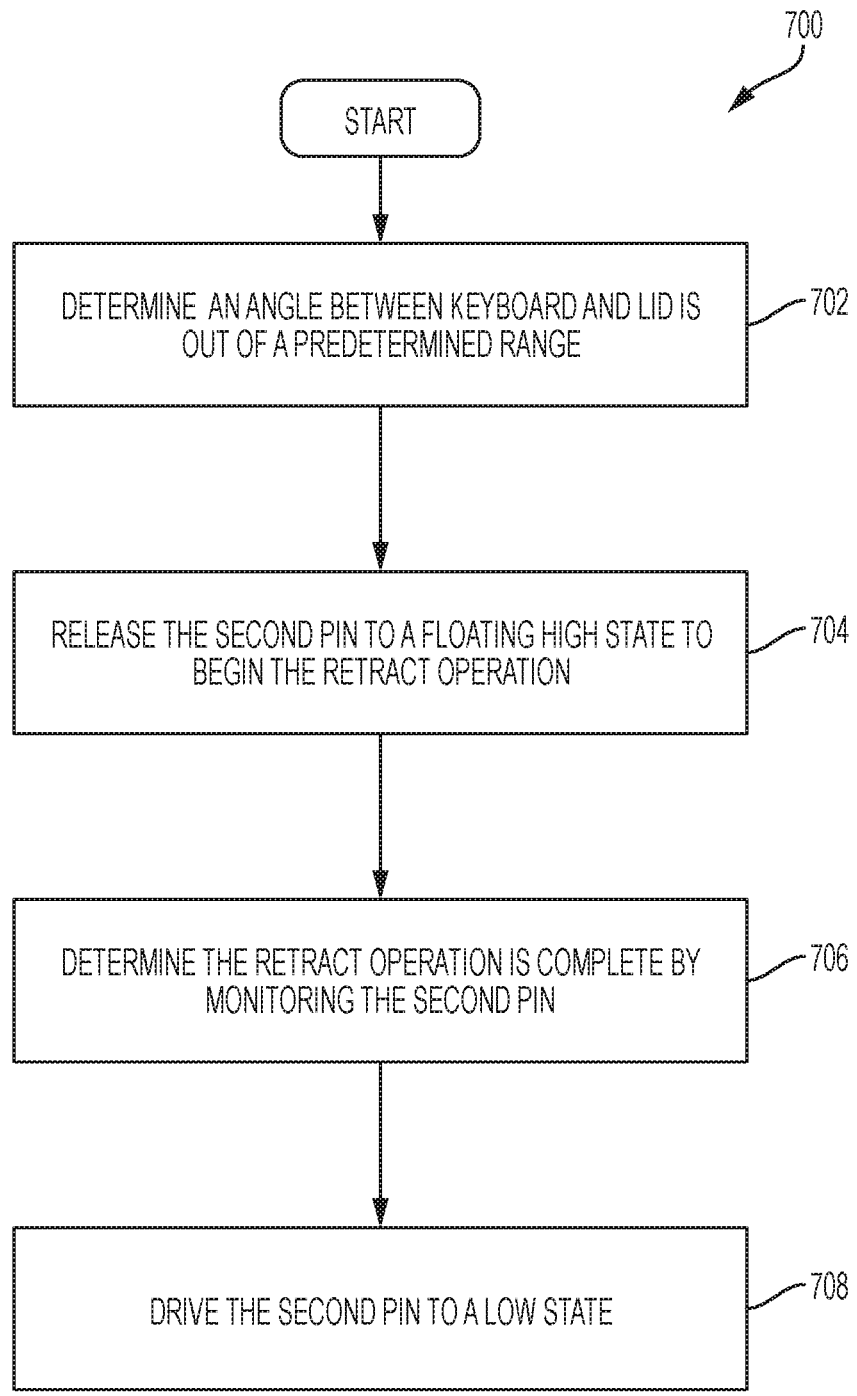
FIG. 7 illustrates a flow chart of an example method for controlling a retractable keyboard of an information handling system according to some embodiments of the present disclosure.

FIG. 7 illustrates an example of a method 700 for controlling a retract operation of a retractable keyboard of an information handling system according to one aspect of the present disclosure. Step 702 determines whether an angle of the keyboard and a lid of the information handling system is out of a predetermined range. If so, at step 704, a controller of the system releases a retraction pin to a floating high state to begin the retract operation of the retractable keyboard. Step 706 determines whether the retract operation is complete by monitoring a voltage state at the retraction pin. The controller determines the retract operation is complete by detecting the voltage of the retraction pin is pulled low by a limit switch. After the retract operation is complete, step 708 drives the retraction pin to a voltage low state. In some embodiments, the controller may be an embedded controller 310, and the retraction pin may be pin 316 as described above. The angle between the keyboard and the lid may be monitored by one or more sensors of the information handling system. And the monitoring of whether the retract operation is complete may be performed by a process as described above in connection with FIGS. 3-4.

The schematic flow chart diagrams of FIGS. 5-7 are generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The operations described above as performed by a controller may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general purpose processor capable of executing instructions contained in software. If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

What is claimed is:

1. An apparatus, comprising:
   a controller comprising:
      a first pin configured to control and monitor an extend operation of a retractable keyboard, wherein the controller is configured to control and monitor the extend operation through a single pin; and
      a second pin configured to control and monitor a retract operation of the retractable keyboard, wherein the controller is configured to control and monitor the retract operation through a single pin.

2. The apparatus of claim 1, wherein the controller is configured to control and monitor through a single pin by determining whether the single pin floats high when not driven by the controller.

3. The apparatus of claim 1, wherein the controller is configured to perform steps comprising:
   driving the second pin to a floating high state to begin the retract operation; and
   determining the retract operation is complete by monitoring the second pin.

4. The apparatus of claim 3, wherein the controller is configured to perform steps comprising determining the retract operation is complete based on a determination that the second pin is in a low voltage state.

5. The apparatus of claim 1, wherein the controller is configured to perform steps comprising:
   driving the first pin to a floating high state to begin the extend operation; and
   determining the extend operation is complete by monitoring the first pin.

6. The apparatus of claim 5, wherein the controller is configured to perform steps further comprising driving the first pin to a low state after determining the extend operation is complete.

7. A method, comprising:
   controlling and monitoring, through a first pin of a controller, an extend operation of a retractable keyboard; and
   controlling and monitoring, through a second pin of the controller, a retract operation of the retractable keyboard.

8. The method of claim 7, wherein the controller is configured to control and monitor the extent operation or retract operation through a single pin by determining whether the single pin floats high when not driven by the controller.

9. The method of claim 7, wherein the controller is configured to perform steps comprising:
   driving the second pin to a floating high state to begin the retract operation; and
   determining the retract operation is complete by monitoring the second pin.

10. The method of claim 9, wherein the controller is configured to perform steps further comprising driving the second pin to a low state after determining the retract operation is complete.

11. The method of claim 7, wherein the controller is configured to perform steps comprising:
    driving the first pin to a floating high state to begin the extend operation; and
    determining the extend operation is complete by monitoring the first pin.

12. The method of claim 11, wherein the controller is configured to perform steps further comprising driving the first pin to a low state after determining the extend operation is complete.

13. An apparatus, comprising:
    a keyboard;
    a first muscle wire coupled to the keyboard and configured to extend the keyboard to a first position to receive user input;
    a second muscle wire coupled to the keyboard and configured to retract the keyboard to a second position to store the keyboard in a computer chassis;
    a first muscle wire controller coupled to the first muscle wire, comprising:
       a first output node controlled to apply a first voltage to the first muscle wire to begin an extend operation;
       a first input node for receiving a first control signal to enable or disable output of the first voltage to the first output node; and
       a first limit switch coupled to the first input and to a ground;
    a second muscle wire controller coupled to the second muscle wire, comprising:
       a second output node controlled to apply a second voltage to the second muscle wire to begin an retract operation;
       a second input node for receiving a second control signal to enable or disable output of the second voltage to the second output node; and
       a second limit switch coupled to the second input node and to a ground; and
    a controller coupled to the first muscle wire controller and to the second muscle wire controller, the controller comprising:
       a first pin configured to control and monitor an extend operation of the keyboard, wherein the controller is configured to control and monitor the extend operation through a single pin; and
       a second pin configured to control and monitor a retract operation of the keyboard, wherein the controller is configured to control and monitor the retract operation through a single pin.

14. The apparatus of claim 13, further comprising a lid coupled to the keyboard, wherein the controller is configured to:

control and monitor the retract operation of the keyboard when an angle between the retractable keyboard and the lid is within a predetermined range; and control and monitor the extend operation of the keyboard when an angle between the retractable keyboard and the lid is out of the predetermined range.

15. The apparatus of claim 13, wherein the first limit switch is configured to close only when the keyboard is extended to the first position and the second switch is configured to close only when the keyboard is retracted to the second position.

16. The apparatus of claim 13, wherein the controller is configured to control and monitor through a single pin by determining whether the single pin floats high when not driven by the controller.

17. The apparatus of claim 13, wherein the controller is configured to perform steps comprising:

driving the second pin to a floating high state to begin the retract operation; and determining the retract operation is complete by monitoring the second pin.

18. The apparatus of claim 17, wherein the controller is configured to perform steps further comprising driving the second pin to a low state after determining the retract operation is complete.

19. The apparatus of claim 13, wherein the controller is configured to perform steps comprising:

driving the first pin to a floating high state to begin the extend operation;

determining the extend operation is complete by monitoring the first pin; and driving the first pin to a low state after determining the extend operation is complete.

20. The apparatus of claim 19, wherein the controller is configured with the first pin and the second pin in as an open drain connection.

* * * * *